US012575002B2

(12) United States Patent
Zhu

(10) Patent No.: US 12,575,002 B2
(45) Date of Patent: Mar. 10, 2026

(54) LOCATION SERVICES NODE BASED CALL STATE REASON INFORMATION MANAGEMENT

(71) Applicant: T-Mobile USA, Inc., Bellevue, WA (US)

(72) Inventor: Yinjun Zhu, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 378 days.

(21) Appl. No.: 18/190,533

(22) Filed: Mar. 27, 2023

(65) Prior Publication Data

US 2024/0334545 A1      Oct. 3, 2024

(51) Int. Cl.
*H04W 76/50* (2018.01)
*H04L 65/1104* (2022.01)
*H04W 4/029* (2018.01)
*H04W 80/10* (2009.01)
*H04W 88/16* (2009.01)

(52) U.S. Cl.
CPC ......... *H04W 76/50* (2018.02); *H04L 65/1104* (2022.05); *H04W 4/029* (2018.02); *H04W 80/10* (2013.01); *H04W 88/16* (2013.01)

(58) Field of Classification Search
CPC ....... H04W 76/50; H04W 4/029; H04W 4/90; H04W 80/10; H04W 88/16; H04L 65/1104; H04L 65/1016; H04L 65/1069
USPC ....................................................... 455/404.1
See application file for complete search history.

(56) References Cited

U.S. PATENT DOCUMENTS 11,070,595 B1 * 7/2021 Asveren ............. H04L 65/1036
2024/0114593 A1 * 4/2024 Sabeur ................... H04L 69/22

* cited by examiner

*Primary Examiner* — Maria El-Zoobi
(74) *Attorney, Agent, or Firm* — Lee & Hayes, P.C.

(57) ABSTRACT

Described herein are techniques, devices, and systems for monitoring reason text received in session initial protocol (SIP) messages. An IP multimedia subsystem (IMS) node can receive a message associated with a communication session being initiated for a user equipment (UE); identify reason information associated with a status of the communication session, the reason information including reason text; and transmit, to another network element, an SIP message including the reason text.

17 Claims, 9 Drawing Sheets

Figure 4:
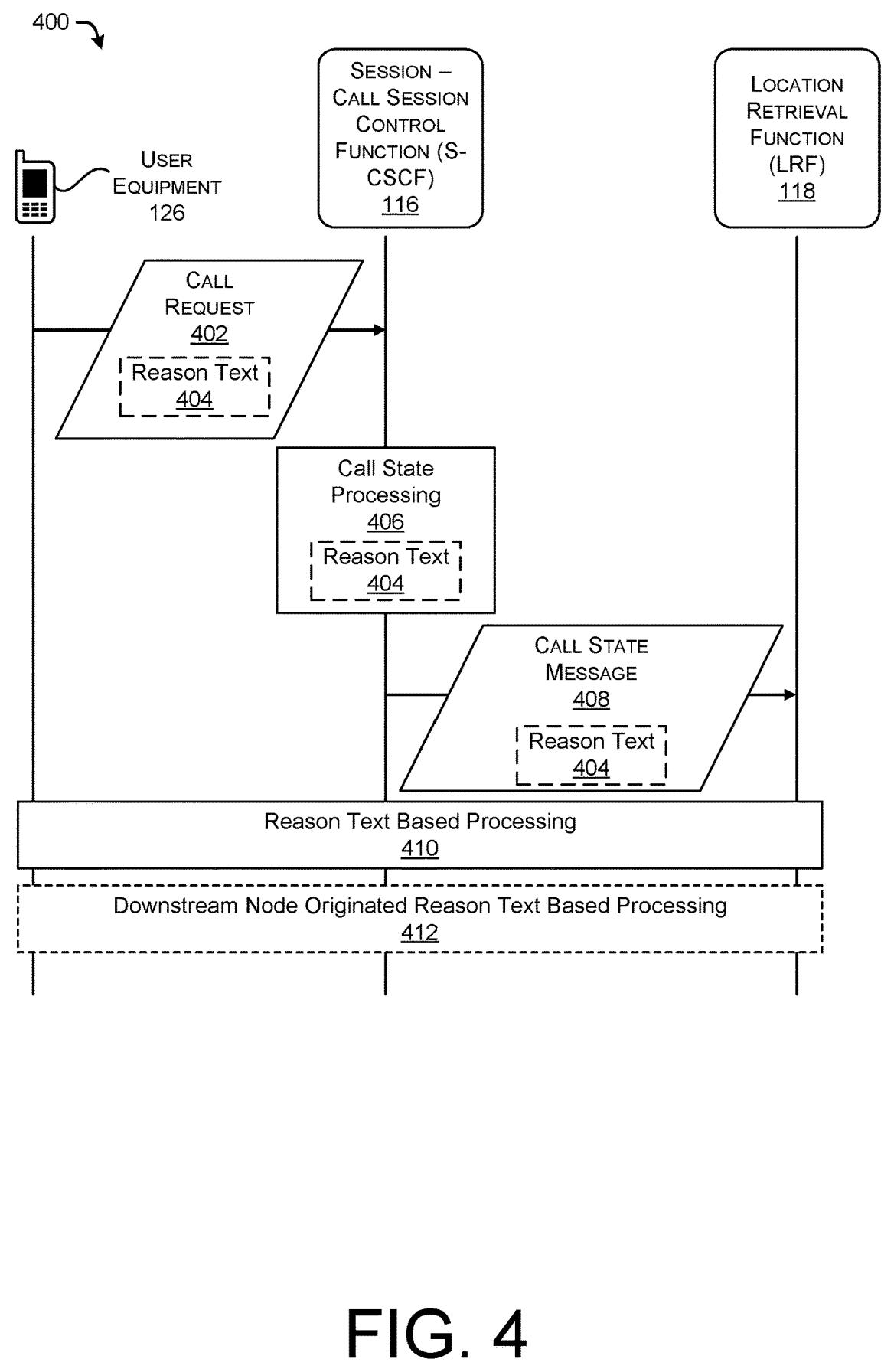

USER
EQUIPMENT
126

SESSION –
CALL SESSION
CONTROL
FUNCTION (S-
CSCF)
116

LOCATION
RETRIEVAL
FUNCTION
(LRF)
118

CALL
REQUEST
402

Reason Text
404

Call State
Processing
406

Reason Text
404

CALL STATE
MESSAGE
408

Reason Text
404

Reason Text Based Processing
410

Downstream Node Originated Reason Text Based Processing
412

Figure 5:
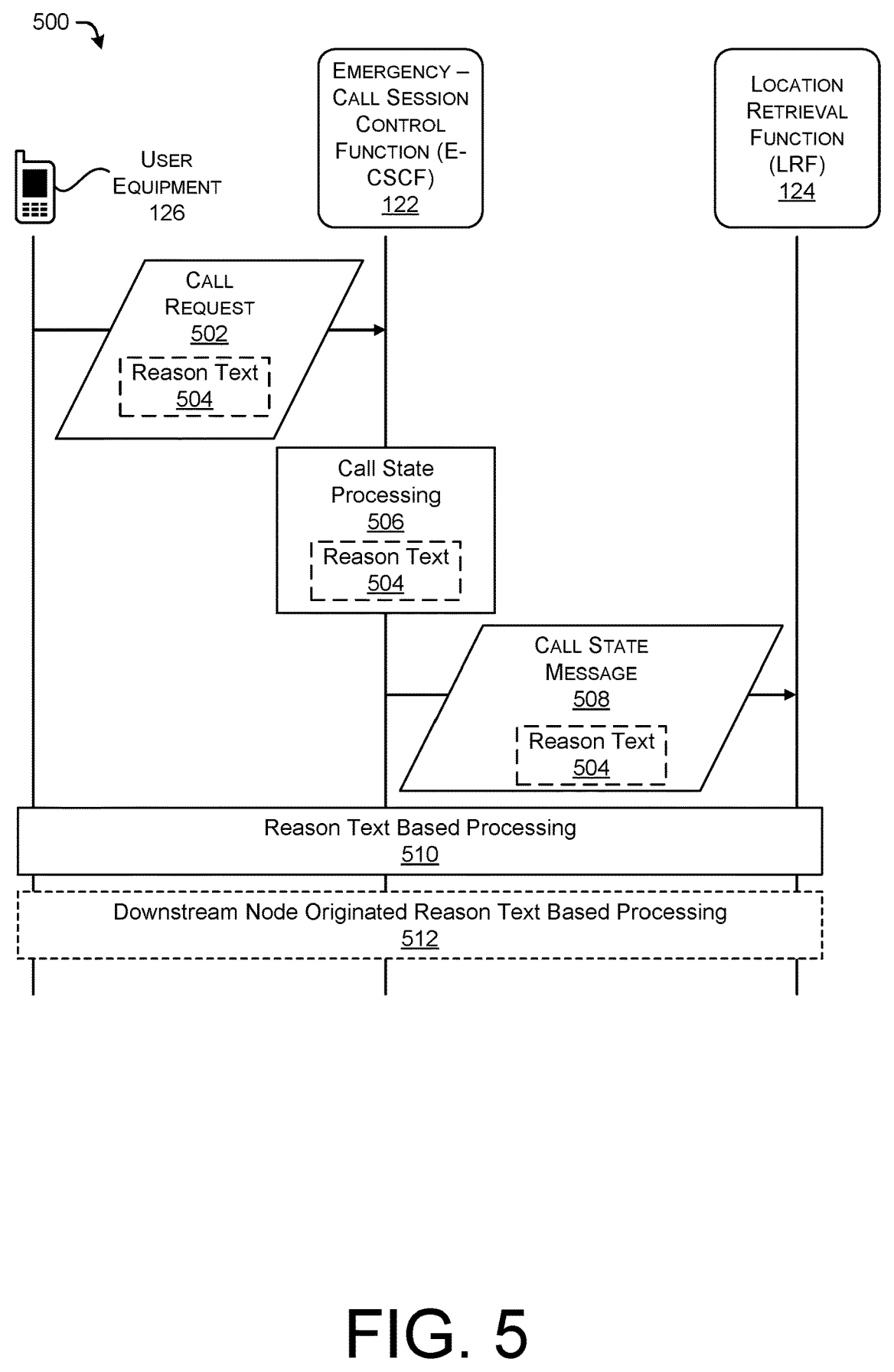

EMERGENCY –
CALL SESSION
CONTROL
FUNCTION (E-
CSCF)
122

USER
EQUIPMENT
126

LOCATION
RETRIEVAL
FUNCTION
(LRF)
124

CALL
REQUEST
502

Reason Text
504

Call State
Processing
506

Reason Text
504

CALL STATE
MESSAGE
508

Reason Text
504

Reason Text Based Processing
510

Downstream Node Originated Reason Text Based Processing
512

RECEIVE A MESSAGE ASSOCIATED WITH A
COMMUNICATION SESSION BEING INITIATED FOR A USER
EQUIPMENT (UE)
802

IDENTIFY REASON INFORMATION ASSOCIATED WITH A
STATUS OF THE COMMUNICATION SESSION, THE REASON
INFORMATION INCLUDING REASON TEXT
804

TRANSMIT, TO ANOTHER NETWORK ELEMENT, A
SESSION INITIAL PROTOCOL (SIP) MESSAGE INCLUDING
THE REASON TEXT
806

LOCATION SERVICES NODE BASED CALL STATE REASON INFORMATION MANAGEMENT

BACKGROUND

Telecommunication networks that include internet protocol (IP) multimedia subsystem (IMS) nodes manage call state information associated with cellular communications that are exchanged via the IMS nodes. The IMS nodes manage session initiation protocol (SIP) messages associated with communication sessions utilized to exchange the cellular communications based on the call state information. The IMS nodes include call session control function (CSCF) nodes to establish, modify, and tear down the communication sessions. The CSCF nodes include proxy call session control functions (P-CSCFs) to manage the SIP messages, and emergency call session control functions (E-CSCFs) to manage emergency SIP messages from among the SIP messages. The SIP messages include SIP invite messages and SIP response messages, the SIP response messages including header information associated with SIP statuses. In some SIP responses, the header information can include, as cause values, SIP response codes.

Location services nodes, including location retrieval functions (LRFs), which are normally integrated with gateway mobile location centers (a.k.a. GMLCs) that provide device locations. The GMLCs, such as LRFs/GMLCs being combinations of LRFs and GMLCs, include the LRFs that can be utilized manage, along with the P-CSCFs and the E-CSCFs, the SIP messages. The LRFs/GMLCs manage device information and subscriber information based on the SIP messages to determine which location techniques are supported by devices requesting communication services.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIG. 3 schematically illustrates an example network environment for repairing network problems based on reason text content, in accordance with some examples of the present disclosure.

FIG. 4 is a diagram illustrating example non-emergency signaling between a user equipment (UE), a session call session control function (S-CSCF) node, and a location retrieval function (LRF), as described herein.

FIG. 5 is a diagram illustrating example emergency signaling between a user equipment (UE), an emergency-call session control function (E-CSCF) node, and a location retrieval function (LRF), as described herein.

FIG. 6 depicts an example window of a user interface (UI) screen for data analysis using location node based management of session initiation protocol (SIP) messages with reason text content.

DETAILED DESCRIPTION

Figure 1:
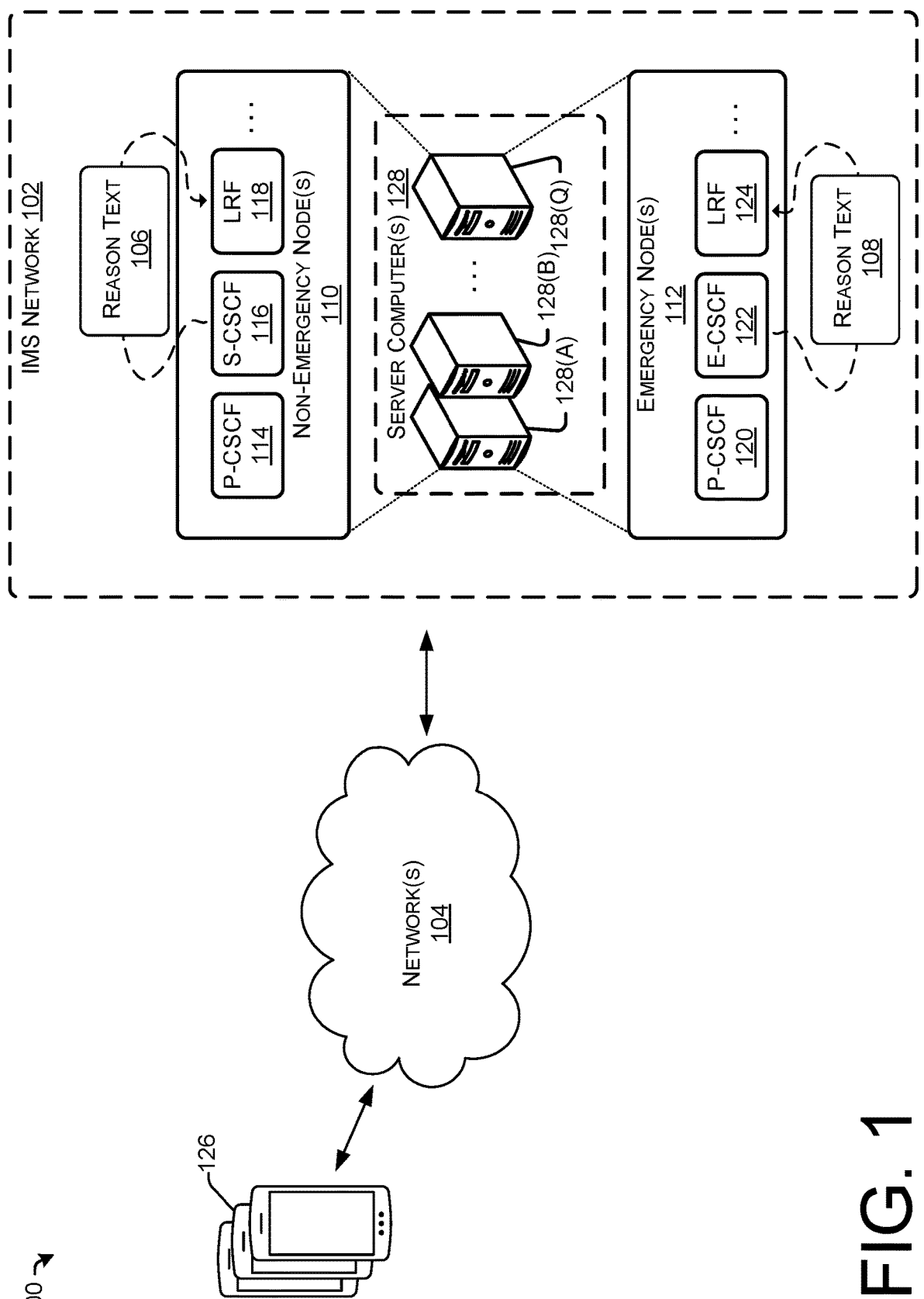
FIG. 1 schematically illustrates an example network environment for location node based management of call state reason text content, in accordance with some examples of the present disclosure.

This disclosure is directed to methods and systems for utilizing location services node directed session initiation protocol (SIP) messages based on reason header information for network management. The SIP messages being generated based on the reason header information can be transmitted by call session nodes, and to location services nodes. Reason text content can be inserted in the SIP messages being generated based on the reason header information. The SIP messages including the reason text content can be generated, based on the reason text content being extracted from reason headers of other SIP messages received by the CSCFs. Reason information including the reason text content can be included as part of various types of location retrieval function (LRF)/gateway mobile location center (GMLC) information being stored in LRF/GMLCs. The reason information that includes the reason text content can identify status information associated with the SIP messages, and/or communication sessions with which the SIP messages are associated.

The call session nodes and the location services nodes can include, respectively, call session control functions (CSCFs) and the LRF/GMLCs. The call session control functions (CSCFs) can include proxy call session control functions (P-CSCFs) utilized to manage non-emergency SIP messages, and emergency call session control functions (E-CSCFs) utilized to manage emergency SIP messages. The P-CSCFs can generate the SIP messages with non-emergency reason text content based on the non-emergency SIP messages. The E-CSCFs can generate the SIP messages with emergency reason text content based on the emergency SIP messages.

Various types of information can be inserted in the SIP messages that include the reason text content. Information that is inserted in the SIP messages with the reason text content can include call state identifiers and response code identifiers based on the other SIP messages received by the CSCFs. The reason text content can include content describing additional information associated with statuses of communication sessions that have call states identified by the call state identifiers, based on occurrents of events identified by the reason code identifiers. The reason text content can be extracted, along with the call state identifies and the reason code identifiers, from the other SIP messages received by the CSCFs.

Network nodes (or "network elements") of various types can perform various types of actions utilizing the reason information stored in the LRF/GMLCs. The actions can include generation, modification, cancellation, and so on, of communication sessions, the communication sessions associated with the actions including the communication sessions for which the reason header information was received, and/or previous, current, and/or subsequent other communication sessions. In some examples, the actions of the network nodes can be triggered by messages received from user devices based on the reason information. In those or other examples, the actions of the network nodes can be performed automatically based on the reason information. The LRF/GMLCs can be pinged, queried, accessed, and/or controlled in various ways for performing the actions based on the reason information, and/or for utilizing, in various other ways, the LRF/GMLC information, including the reason information.

As noted above, utilizing location services node directed SIP messages based on reason header information for network management has many technical benefits. Firstly, it reduces extraneous network traffic, thereby conserving network bandwidth in a network (e.g., a telecommunications network). Subsequent transmissions of unnecessary messages and/or data that would otherwise occur in conventional systems based on incomplete diagnoses of causes of network incidents can be eliminated based on techniques discussed herein. That is, causes of network problems can be identified using the reason information, which enables communication paths for communication sessions to be rerouted, and which further enables any relevant messages to be transmitted using other fully functional network equipment.

Secondly, the benefits resulting from operations performed according to the techniques discussed herein include efficient modification and/or repair of network equipment. Message transmissions can resume using the modified and/or repaired network equipment more quickly than in conventional systems. The conventional systems, for which malfunctional equipment is not able to be efficiently and accurately identified and/or repaired, operate inferiorly for longer periods of time than in systems using the techniques as discussed herein. Repairing network problems without delay according to the techniques discussed herein allows for efficient utilization of network resources, and load is more evenly distributed across the network in a dynamic fashion. Furthermore, identification of statuses of communication sessions can increase the analytical success rate in determining the cause of the server outage, which may lead to efficient performance of corrective actions for repairing network error condition(s). In addition, notification to other (e.g., downstream, upstream, etc.) devices about a server outage allows for finding and utilizing a different, in-service server device sooner, and shortly after the out-of-service condition of the server device is detected, thereby improving network reliability.

The methods, apparatuses, and systems described herein can be implemented in a number of ways. References are made to the accompanying drawings that form a part hereof, and in which are shown by way of illustration specific configurations or examples, in which like numerals represent like elements throughout the several figures.

Illustrative Systems for Location Node Based Management of Call State Reason Text Content FIG. 1 schematically illustrates an example network environment 100 for location node based management of call state reason text content, in accordance with some examples of the present disclosure. The network environment 100 can include an internet protocol (IP) multimedia subsystem (IMS) core network ("IMS network") 102 and one or more networks 104 that are associated with a wireless service provider. The IMS network 102 can be included in, and/or different from, the network(s) 104. The environment 100 is illustrated in simplified form and can include many more components.

The environment 100 can include one or more nodes utilized to exchange reason text content (also referred to herein as "reason text"), which can be stored in one or more location services nodes. The reason text content can include, for example, a description of a cause of a problem associated with a communication session. In various examples, the description can identify information (e.g., "key information") associated with a change of a call state associated with the communication session. In those or other examples, the key information can include a network component, such as a node or a device, that caused the call state change. In those or other examples, the key information can include information associated with problem that resulted the call state change, such as a type of the problem, a cause of the problem, context related to the cause of the problem, etc., and so on, or any combination thereof. Information included in the reason text content can be utilized to identify, manage, record, and/or resolve the problem.

The reason text content can include non-emergency reason text content (e.g., reason text 108) (e.g., reason text based on "non-911" calls, such as short code calls (e.g., "411," "511," "711," etc., calls), toll free calls (e.g., "800," "888," etc., calls), various other types of calls (e.g., "easy-to-remember" service calls) (e.g., "988" suicide and/or crisis lifeline calls), etc.), and/or non-emergency reason text content (e.g., reason text 108) (e.g., reason text based on "911" calls). The nodes utilized to exchange the reason text content can include one or more nodes (or "non-emergency nodes") 110 associated with non-emergency communications, and one or more nodes (or "emergency nodes") 112 associated with emergency communications.

The node(s) utilized to manage the reason text content can include, in the non-emergency node(s) 110, a proxy call session control function (P-CSCF) node ("P-CSCF") 114, a serving call session control function (S-CSCF) node ("S-CSCF") 116, and a location retrieval function (LRF) 118 utilized to manage the non-emergency reason text content 106; and, in the emergency node(s) 112, a P-CSCF 120, an emergency call session control function (E-CSCF) node ("E-CSCF") 122, and an LRF 124 utilized to manage the emergency reason text content 108. The location services node(s) utilized to manage the reason text content can include the LRF 118 being utilized to manage the non-emergency reason text content 106, and the LRF 124 being utilized to manage the emergency reason text content 108.

The reason text content being managed utilizing the location services node(s) can include the non-emergency reason text content 106 being transmitted by the S-CSCF 116 and received by the LRF 118, and the emergency reason text content 108 being transmitted by the E-CSCF 122 and received by the LRF 124. The non-emergency reason text content 106, which can be stored in the LRF 118, can be accessed, modified, extracted, and/or deleted for non-emergency communication session management. The emergency reason text content 108, which can be stored in the LRF 124, can be accessed, modified, extracted, and/or deleted for non-emergency communication session management.

The reason text content can be managed for one or more user equipment (UEs) 126, via the IMS network 102 and/or the network(s) 104. The reason text content being manage for the UEs 126 can be generated based on one or more communication sessions (e.g., one or more call sessions) being initiated by the UEs 126. The communication session(s) can include the non-emergency communication session(s), which can be associated with one or more non-emergency calls, and/or the emergency communication session(s), which can be associated with one or more emergency calls.

The reason text content can be extracted, by at least one of the CSCFs, from one or more messages received by the CSCFs, and inserted in one or more other messages being transmitted by the CSCFs and to the LRFs. In some examples, the non-emergency reason text content 106 can be extracted, by the S-CSCF 116, and from a non-emergency message (e.g., a header in a non-emergency message) received by the S-CSCF. In those or other examples, the non-emergency reason text content 106 can be inserted in a message (e.g., a non-emergency message) being transmitted by the S-CSCF 116 and to the LRF 118. In some examples, the emergency reason text content 108 can be extracted, by the E-CSCF 122, and from an emergency message (e.g., a header in an emergency message) received by the E-CSCF 122. In those or other examples, the emergency reason text content 108 can be inserted in a message (e.g., a non-emergency message) being transmitted by the E-CSCF 122 and to the LRF 124.

In some examples, individual ones of the node(s) (e.g., the non-emergency node(s) 110, the emergency node(s) 112, etc.), which can also be referred to herein as a "cell," can be a wireless node or a wired node. The node(s), which can be coupled to the IMS network 102 and/or some other network (e.g., at least one of the network(s) 104), can handle traffic and signals between more or more electronic devices, such as the UEs 126, and the IMS network 102. For example, individual ones of the node(s) can perform transcoding of speech channels, allocation of radio channels to electronic devices, paging, transmission and reception of voice and data, as well as other functions. The node(s) can include one or more base transceiver stations (BTS). Individual ones of the BTS(s) can include one or more transceivers, one or more antennas, and one or more additional network switches and control equipment that provide a network cell for facilitating wireless communication between the UEs 126 and the IMS network 102. The node(s) and one or more other nodes have any type or amount of overlapping coverage or mutually exclusive coverage. In some examples, the node(s) can include a gNodeB, an eNodeB, another type of base station, or any combination thereof.

In some instances, the environment 100 can further include one or more servers computer 128 (e.g., server computers 128(A), 128(B), . . . 128(Q))), to facilitate communications by and between the various devices in the environment 100 and perform operations relating to processing of calls. That is, environment 100 can include any computing devices implementing various aspects of one or more of second, third, fourth generation, and fifth generation (2G, 3G, 4G, and 5G) cellular wireless access technologies, which may be cross-compatible and may operate collectively to provide data communication services. Global systems for mobile (GSM) is an example of 2G telecommunications technologies; universal mobile telecommunications system (UMTS) is an example of 3G telecommunications technologies; and long-term evolution (LTE), including LTE advanced, evolved high-speed packet access (HSPA+) are examples of 4G, and 5G new radio (NR) is an example of 5G telecommunications technologies. Thus, the environment 100 may implement GSM, UMTS, LTE/LTE Advanced, and/or 5G NR telecommunications technologies.

The network(s) 104 can include, for example, an access network, which can be any sort of access network, such as a GSM or UMTS network. The access network can include any aspects of one or more of second, third, fourth generation, and fifth generation (2G, 3G, 4G, and 5G) cellular-wireless access technologies. The access network can also be referred to as a universal terrestrial radio network (UTRAN) or a GSM EDGE radio access network (GERAN) and can include one or more base stations, as well as a radio network controller (RNC). As briefly discussed above, a network, such as the access network, can be associated with a wireless telecommunication service provider.

Although the IMS node(s) can be separate nodes, as discussed above in the current disclosure, it is not limited as such. In some examples, implementation of the node(s) in the IMS network 102 can include one or more combinations with one or more of any of the IMS node(s) (e.g., the non-emergency node(s) 110, the emergency node(s) 112, one or more other nodes, etc.) as a single node.

Figure 2:
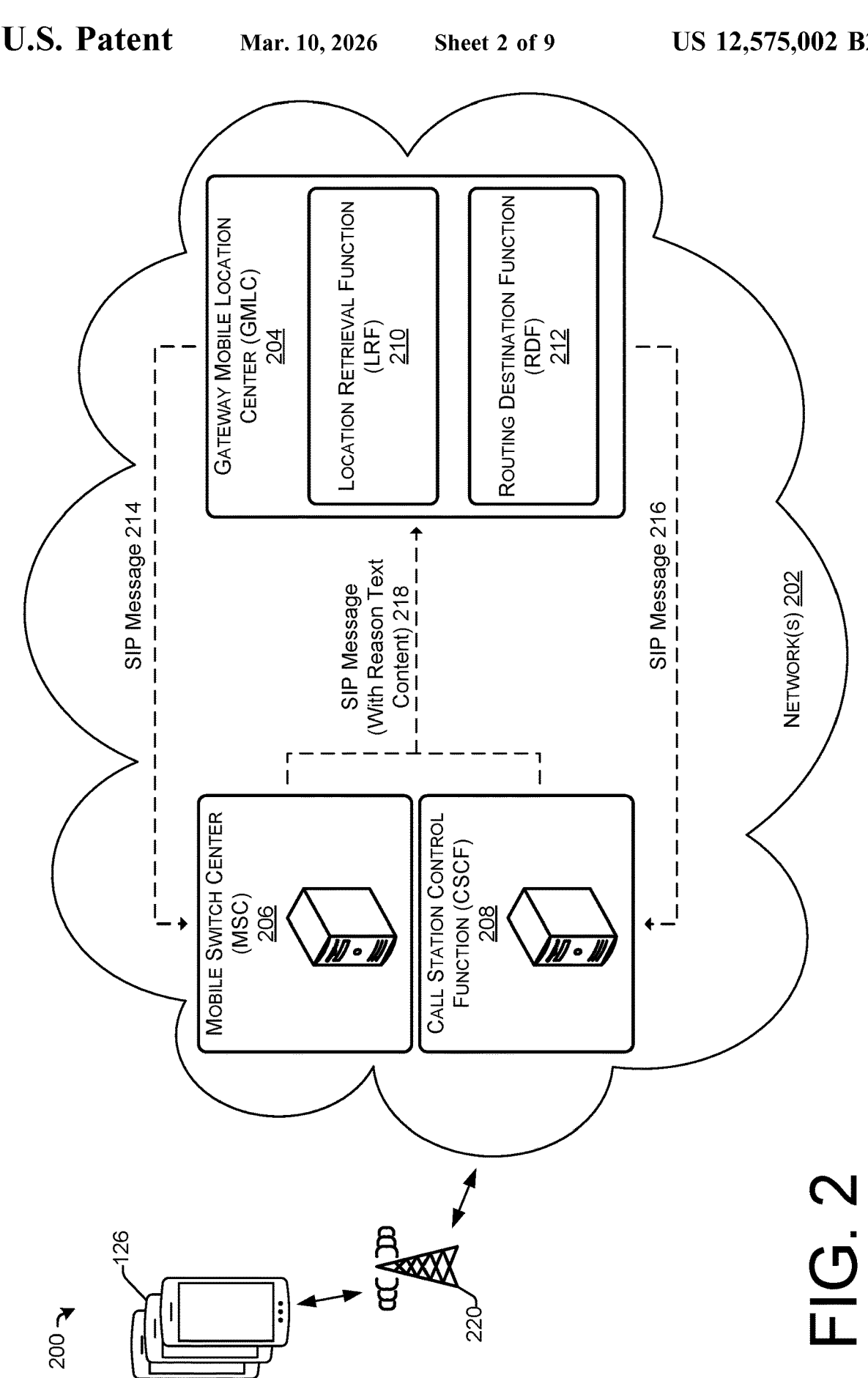
FIG. 2 schematically illustrates an example network environment for location node based management of session initiation protocol messages with reason text content, in accordance with some examples of the present disclosure.

FIG. 2 schematically illustrates an example network environment 200 for location node based management of session initiation protocol messages with reason text content, in accordance with some examples of the present disclosure. The network environment 200 can include one or more networks 202. In some examples, at least one of the network(s) 202 can be included in, implemented as, the IMS network 102 and/or any of the network(s) 104.

The network(s) 202 can include a gateway mobile location center (GMLC) (e.g., a location retrieval function (LRF)/GMLC) 204, a mobile switch center (MSC) 206, and/or a call state control function (CSCF) 208. The GMLC 204 can include an LRF 210 and/or a routing destination function (RDF) 212. In some examples, the GMLC 204 can be utilized to perform functions separate from functions performed by the LRF 210 that is included in the GMLC 204. In other examples, the GMLC 204 can be any combination of the GMLC 204 and at least one LRF (e.g., the LRF 210), such as with the GMLC 204 and the LRF 210 being integrated and/or implemented as a same platform (e.g., an LRF/GMLC). In various implementations, the GMLC 204 (e.g., the GMLC 204 and/or the LRF 210) can be utilized to perform any functions of the LRF 118 and/or the LRF 124, as discussed above with reference to FIG. 1. In some examples, the LRF 210 can be implemented as the LRF 118 and/or the LRF 124. In those or other examples, the CSCF 208 can be implemented as the S-CSCF 116 and/or the E-CSCF 122, as discussed above with reference to FIG. 1.

Although the GMLC 204 can be implemented as a GMLC or an LRF/GMLC, as discussed above in the current disclosure, it is not limited as such. In some examples, one or more GMLCs (e.g., the GMLC 204) can be utilized as a location service entity (e.g., one or more location service devices), separate from at least one IMS network (e.g., the IMS network 102). In those examples, one or more LRFs (e.g., the LRF 210) can be implemented as a functional entity (e.g., one or more functional devices) being in the IMS network(s) and/or being interconnected with one or more IMS entities (e.g., one or more nodes and/or devices in the IMS networks, such as the nodes(s) 110 and/or the node(s) 112 in the IMS network 102).

One or more devices, such as the GMLC 204, the MSC 206, and/or the CSCF 208 can be utilized to manage reason text content. The MSC 206 and/or the CSCF 208 can receive session initiation protocol (SIP) messages, such as an SIP message 214 being received by the MSC 206, and/or an SIP message 216 being received by the CSCF 208. In some examples, the MSC 206 and/or the CSCF 208 can transmit one or more SIP messages, such as an SIP message (with reason text content) 218, to the GMLC 204. In those or other examples, the reason text content inserted in the SIP message 218 can be extracted by the MSC 206 and from the SIP message 214, and/or be extracted by the CSCF 208 and from the SIP message 216.

The GMLC 204, the MSC 206, and/or the CSCF 208 can utilize the reason text content to manage one or more non-emergency communication sessions and/or one or more emergency communication sessions. In some examples, for instance with the GMLC 204, the MSC 206, and/or the CSCF 208 being utilized to manage the non-emergency communication session(s) and/or the emergency communication session(s), individual ones of at least one SIP message, including the SIP message 214 and/or the SIP message 216, can include any of various types of SIP messages (e.g., a SIP "cancel" message, a SIP "bye" message, a SIP "4xx" message, a SIP "5xx" message, a SIP "6xx" message, etc.). In those or other examples, individual ones of at least one SIP message, including the SIP message 218, can include any of various types of SIP messages (e.g., a SIP "notify" message. By way of example, the reason text content can be extracted from the SIP message 214 or the SIP message 216 (e.g., from a header, such as a "reason header," of the SIP message 214 or the SIP message 216) and inserted, by the MSC 206 or the CSCF 208, into the SIP message 218.

The reason text content can be stored in the GMLC 204, such as with the reason text content being stored in the LRF 210, the RDF 212, and so on, or any combination thereof. In some implementations, the LRF 210, the RDF 212, and/or one or more other devices of the GMLC 204 utilized to store reason text content (e.g., non-emergency reason text content) for a non-emergency communication session can be the same as, or different from, the LRF 210, the RDF 212, and/or one or more other devices of the GMLC 204 utilized to store reason text content (e.g., non-emergency reason text content) for an emergency communication session.

Various types of information, including the reason text content, can be extracted from the SIP message 214 and/or the SIP message 216. In some examples, information associated with one or more call states and/or one or more errors (e.g., error statuses) can be extracted, along with the reason text content, from the SIP message 214 and/or the SIP message 216.

In those or other examples, the extracted information associated with the call state(s) can include one or more call state attributes (e.g., an trying state, a proceeding state, etc.), one or more event attributes (e.g., a reject status attribute, an error status attribute, a replaced status attribute, a canceled status attribute, a local-bye status attribute, a remote-bye status attribute, and/or an end of route status attribute (e.g., an end of route option status attribute)); and/or the extracted information associated with the errors can include one or more error attributes (e.g., one or more error codes, one or more error code attributes, etc.) (e.g., a "4xx" code, a "5xx" code, a "6xx" code, etc.). The reason text can be different from the call state attribute(s), the event attribute(s), and the error code(s).

The reason text content can be different from, and/or supplemental to, the call state attribute(s), the event attribute(s) and/or the error attribute(s). In some examples, information not encapsulated by the non-reason text content portion of the SIP message 214 and/or the SIP message 216 can be provided via the reason text content. For instance, information not encapsulated by the call state attribute(s), the event attribute(s), and/or the error attribute(s) in the SIP message 214 and/or the SIP message 216 can be provided via the reason text content. By way of example, the reason text content can include additional and/or supplemental information regarding a cause of an event identified by an event attribute and/or an error identified by an error attribute.

The network(s) 202 can be utilized by the user equipment (UEs) 126, as discussed above with reference to FIG. 1, the UEs 126 utilizing one or more base stations (e.g., one or more gNodeBs, one or more eNodeBs, and so on, or any combination thereof) 220 to exchange one or more communications via the network(s) 202.

The reason text content can be associated with one or more communications for the UEs 126. The reason text content, which can include a reason header of the SIP message 214 and/or the SIP message 216, can be extracted from the SIP message 214 and/or the SIP message 216 and inserted in the SIP message 218. The reason text content can provide information (e.g., scenario information) regarding various types of scenarios (e.g., causes of events/errors), such as a scenario when a user equipment (e.g., one of the UEs 126) loses radio coverage, or a scenario in which the CSCF 208 experiences an internal error (e.g., a timeout), and so on, or any combination thereof. For instance, the reason text content can provide the scenario information, which would otherwise be missing in such cases in which the reason text content is not inserted in the SIP message 218. By including the reason text content in the SIP message 218, the MSC 206 and/or the CSCF 208 can inform the GMLC 204 of information related to a cause of a network problem (e.g., a device and/or call routing error or problem, a loss of service, a network node malfunction, etc.)

Figure 3:
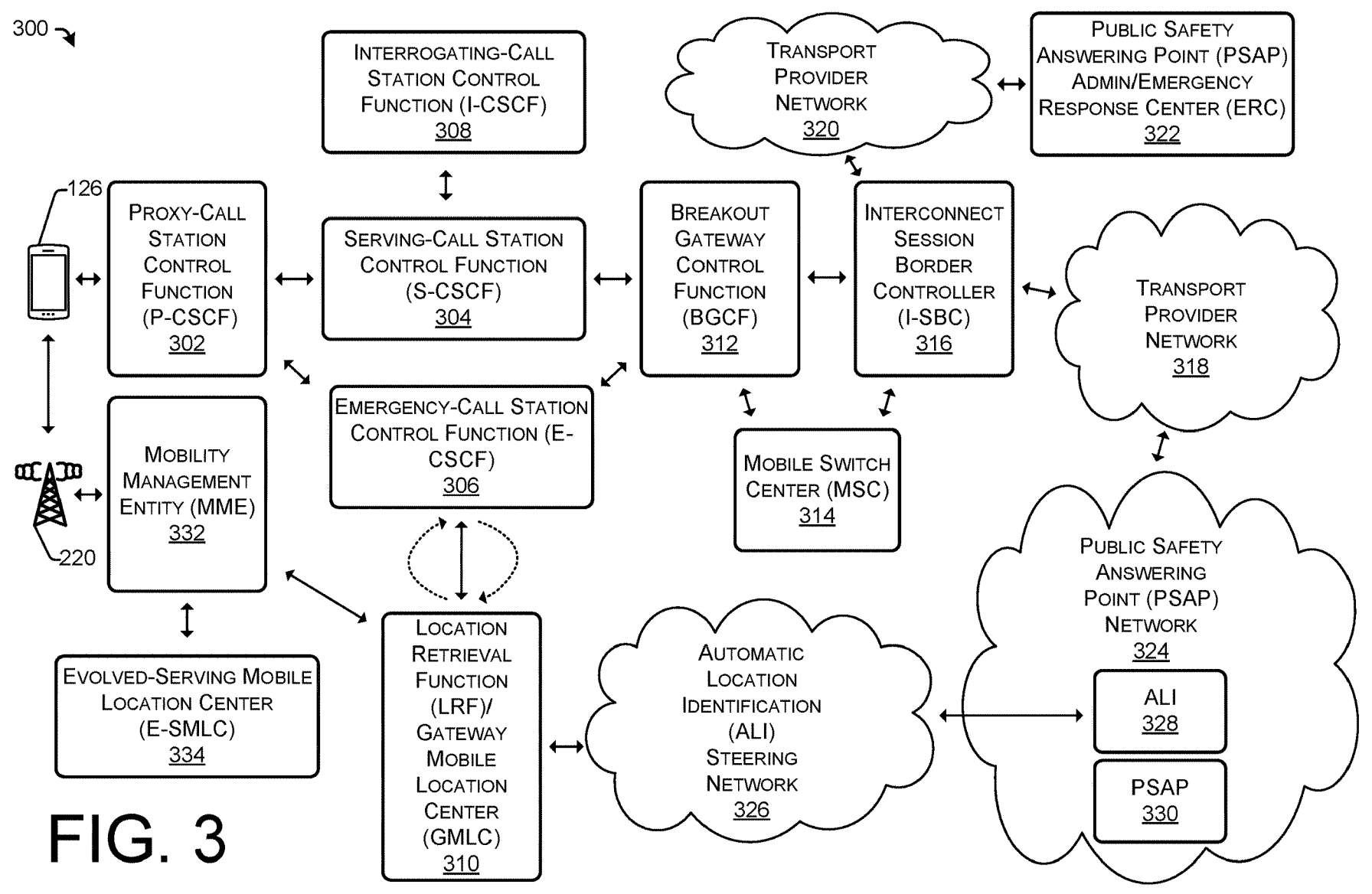

FIG. 3 schematically illustrates an example network environment 300 for repairing network problems based on reason text content, in accordance with some examples of the present disclosure. In some implementations, as discussed below in further detail, information, such as reason text content, can be utilized to present information to users, communicate information to the users, and/or to manage communication sessions, such as by establishing, modifying, ending, and so on, current and/or subsequent communication sessions associated with user equipment (UEs) (the UEs 126, as discussed above with reference to FIG. 1, and/or one or more other UEs).

In various examples, the environment 300 can include one or more networks (e.g., the network(s) 104, as discussed above with reference to FIG. 1, the network(s) 202, as discussed above with reference to FIG. 2, one or more other networks, or any combination thereof), which can include one or more nodes. The node(s) can include a proxy call session control function (P-CSCF) node ("P-CSCF") 302, a serving call session control function (S-CSCF) node ("S-CSCF") 304, an emergency call session control function (E-CSCF) node ("E-CSCF") 306, and/or an interrogating call session control function (I-CSCF) node ("I-CSCF") 308. The P-CSCF 302, the S-CSCF 304, the E-CSCF 306, and the I-CSCF 308 can be utilized to manage one or more communication sessions.

In some examples, the P-CSCF 302, the S-CSCF 304, the E-CSCF 306, the I-CSCF 308, or any combination thereof, can be implemented as the CSCF 208, as discussed above with reference to FIG. 2. In those or other examples, the P-CSCF 302 and the S-CSCF 304 can be implemented as the P-CSCF 114 and the S-CSCF 116, as discussed above with reference to FIG. 1. In those or other examples, the P-CSCF 302 and the E-CSCF 306 can be implemented as the P-CSCF 114 and the E-CSCF 122, as discussed above with reference to FIG. 1.

In various examples, the node(s) of the environment 300 can include a location retrieval function (LRF)/gateway mobile location center (GMLC) 310. In some examples, the LRF/GMLC 310 can be implemented as the GMLC 204, as discussed above with reference to FIG. 2. The GMLC 310 can be utilized to identify location information associated with the UE 126. The LRC/GMLC 310 can provide the location information to one or more other nodes (e.g., the S-CSCF 304) (e.g., the E-CSCF 306) (e.g., the PSAP 330 and/or the ALI 328, via the PSAP network and/or the ALI steering network 326, as discussed below in further detail).

In various examples, the node(s) of the environment 300 can include a breakout gateway control function (BGCF) 312, a mobile switch center (MSC) 314, an interconnect session border controller (I-SBC) 316, a transport provider network 318, a transport provider network 320, and/or a public safety answering point (PSAP) admin/emergency response center (ERC) 322. In some examples, the transport provider network 318 can be integrated with the transport provider network 320; or the transport provider network 318 can be separate from the transport provider network 320. In those or other examples, the transport provider network 318, the transport provider network 320, or any combination thereof, can be implemented as at least one network in the network(s) 202 as discussed above with reference to FIG. 2, and/or the network(s) 104, as discussed above with reference to FIG. 1.

In various examples, the node(s) of the environment 300 can include a public safety answer point (PSAP) network 324, and/or an automatic location identification (ALI) steering network 326. The PSAP network can include an ALI 328 and/or a PSAP 330. In various examples, the node(s) of the environment 300 can include a mobility management entity (MME) 332 and an evolved serving mobile location center (E-SMLC) 334.

In some examples, the environment 300 can be utilized to manage one or more communications for a user equipment (UE) (e.g., any of the UEs 126). The UE 126 can be communicatively coupled to a base station (e.g., any of the base station(s) 220, as discussed above with reference to FIG. 2).

In some examples, the P-CSCF 302 can receive an SIP message (e.g., an SIP "invite" message) associated with a communication session for a call placed the UE 126, the SIP message being transmitted by the UE 126 and to the IMS network 102. The P-CSCF 302 can transmit (e.g., forward, relay, route, etc.) the SIP message to an intended destination (e.g., to another device, via at least one other network node, such as the S-CSCF 304, or the E-CSCF 306, etc.) or to at least one intermediate server (e.g., at least one of the server computer(s) 128, as discussed above with reference to FIG. 1) closer to the intended destination.

The S-CSCF 304, which can be utilized as a primary node to manage the communication session, can route call signaling associated with the SIP message, based on the SIP message being a non-emergency SIP message. Routing by the S-CSCF 304 can include the call signaling being routed based on routing information identified by the I-CSCF 308. The I-CSCF 308 can, during registration of the UE 126 with the IMS network 102, assign and/or ascertain the S-CSCF 304 to be used. In some examples, the I-CSCF 308 can be utilized to route call signaling associated with one or more other SIP messages (e.g., one or more other SIP requests) arriving from one or more other SIP networks. The I-CSCF 308 can query a home subscriber server (HSS) in order to discover to which S-CSCF (e.g., the S-CSCF 304) a particular subscriber (e.g., the UE 126) has been assigned.

The E-CSCF 306 can determine location information, including a location associated with the UE 126, based on the SIP message being an emergency SIP message routed by the P-CSCF 302 and to the E-CSCF 306. The E-CSCF 306 can, if the E-CSCF 306 is unable to determine the location, transmit at least one request message to the LRC/GMLC 310 for the location. The LRC/GMLC 310 receiving the request message(s) can identify the location of the UE 126, and a destination location (e.g., the PSAP/ERC 322, the PSAP 330, another device, etc.) associated with the call.

The SIP message (e.g., call signaling associated with the SIP message) can be routed, by the S-CSCF 304 or the E-CSCF 306, and to the BGCF 312. The BGCF 312 can be utilized, along with the MSC 314 and/or the I-SBC 316, to route the SIP message (e.g., the call signaling associated with the SIP message) to the destination location (e.g., the device being the destination location), based on the destination location being a phone in a circuit switched network. For example, with instances in which, the BGCF 312 can forward the signaling to a selected public switched telephone network (PSTN)/public land mobile network (PLMN), which can include the phone. In some examples, the PSTN/PLMN, which can be communicatively coupled to, and/or which can include the PSAP ERC 322 and/or the PSAP 330, can be integrated with, and/or be separate from, the transport provider network 318 and/or the transport provider network 320.

The MSC 314 and/or the I-SBC 316 can be utilized, along with the BGCF 312, to route the SIP message. The MSC 314 can act as a telephone exchange to make a connection between the UE 126 and to the PSTN/PLMN. The I-SBC 316 can manage security, traffic scrubbing, address manipulation and/or media transcoding between the IMS network 102 and the PSTN/PLMN.

The communication session for the call placed by the UE 126 can be managed based on a phone number (e.g., an automatic number identification (ANI)) and destination location information (e.g., the ALI 328). The ANI and/or the ALI 328 can be associated with a device (e.g., the phone) in the PSAP network 324 (e.g., the PSAP in the PSAP network 324). The destination location information in the ALI 328 can include various types of destination location information, such as a building name, a suite number, a floor number, a room number, and so on, or any combination thereof.

The ALI steering network 326 can be utilized to route the call for the UE 126 and to the PSAP network 324 (e.g., to the ALI 328). The communication session can be managed based on the information associated with the ALI steering network 326 and/or the ALI 328.

The MME 332 and/or the E-SMLC 334 can be utilized to identify the location information associated with the UE 126, the location information being utilized by the LRF/GMLC 320. For example, the MME 332 can provide the location information to the LRF/GMLC 320. The location information, which can be provided by the MME 332 and to the LRF/GMLC 320, can be obtained by the MME 332 and from the E-SMLC 334. The location information can be provided by the E-SMLC 334, based on the E-SMLC 334 performing a positioning procedure and returning the location information (e.g., a location estimate) to the MME 332. The MME 332 can be communicatively coupled to the UE 126 via the base station 220.

The reason text content identified by the GMLC 310 can be utilized for performing one or more actions of various types. In some examples, the action(s) can include causing, by one or more servers (e.g., one or more the server computers 128, and/or one or more other server computers), presentation by displays of one or more user devices of one or more users (e.g., one or more network administrators, etc.), of information based on the reason text content. By way of example, problem cause information, statistical information, prediction information, etc., can be presented by the displays based on the reason text content. In various implementations, presentation by the displays can include presentation of the reason text content (e.g., presenting text of the reason text content, and/or presenting text and/or a symbol with a characteristic (e.g., a shape, color, etc.), respectively used to represent the reason text content for different corresponding types of problems).

In some examples, one or more communication sessions can be managed. The communication session(s) being manage can include the communication session associated with the UE 126, and/or one or more other communication sessions associated with one or more other UEs (e.g., one or more others of the UEs 126). Managing the communication session(s) can include establishing, modifying, ending, and so on, one or more current communication sessions (e.g., the communication session for the UE 126, and/or one or more current communication sessions for the other UEs) and/or one or more subsequent communication sessions (e.g., one or more communication sessions not yet established for the other UEs).

By way of example, modifying the communication session(s) can include modifying one or more of any of the node(s) and/or network(s), as discussed above, removing one or more of any of the node(s) and/or network(s), as discussed above, replacing one or more of any of the node(s) and/or network(s), as discussed above, with one or more other node(s) and/or network(s), respectively, adding one or more different nodes (e.g., one or more new nodes) and/or one or more different networks (e.g., one or more new networks), rerouting one or more corresponding current paths for the communication session(s), identifying one or more different nodes and/or paths to be used for one or more subsequent communication sessions, and so on, or any combination thereof.

The presentation of the information and/or the performance of the action(s) can be utilized to correct one or more network problems, such as one or more problems identified by the reason text content. In some examples, the user(s) can respond to the presentation of the information by providing one or more user selections via one or more user interfaces of the server computer(s) to cause any of the action(s). The user selection(s) can include one or more identifiers, the identifier(s) being of one or more other network nodes, one or more other node configurations, one or more other node settings, one or more other firmware components, one or more other software components, etc.

In those or other examples, the action(s) can include one or more automated actions performed dynamically (e.g., in real-time) based on the reason text content. Dynamically performing the action(s) can include the action(s) being performed while the communication session(s) are active, and/or management of one or more calls associated with any of the UEs 126 while the call(s) are being established, or are currently being maintained, and so on, or any combination thereof.

The network(s) and/or the node(s) in the environment 300 can be managed in various ways. In some examples, one or more configurations, one or more settings, one or more software components, one or more firmware components, and so on, or any combination thereof, which can be associated with one or more hardware devices, can be managed based on the reason text content. By way of example, a configuration, a setting, a software component, and/or a firmware component associated with a hardware device (e.g., a device being managed as one or more network nodes, such as a network node with which the reason text content is associated) can be managed. In such an example, the configuration, the setting, the software component, and/or or the firmware component associated with the hardware device (e.g., a server) can be modified, replaced, updated, upgraded, etc., or any combination thereof.

For instance, management of the device can be based on a problem identified by the reason text content, such as by managing replacement and/or substitution of a device (e.g., a base station (e.g., an initial base station and/or node)) being utilized by the UE 126 with another device (e.g., another base station and/or node) that is capable of remedying the problem (e.g., the other base station can be utilized for providing communications for the UE 126 based on the other base station being capable of providing network coverage at a higher level than a level of network coverage at which the initial base station is able to provide). Any management (e.g., changing between the base stations) being performed based on the reason text content can be performed by the server(s) (e.g., the server(s) 128) automatically based on the reason text content, and/or manually based on user input provided to a user device (e.g., one of the server(s) 128 and/or one or more other devices, such as a network administrator device) in response to the reason text content.

In various examples, any of the network(s) and/or the node(s) can be managed in a similar way as the base station and/or the node, as discussed above, based on the reason text content. The network(s) and/or the node(s), and/or any of the component(s) associated with the network(s) and/or the node(s), can be identified, modified, replaced, upgraded, etc., or any combination thereof, based on identifying the network(s) and/or the node(s), and/or any of the component(s) associated with the network(s) and/or the node(s), are indicated by, and/or associated with, the reason text content (e.g., the problem with which the reason text content is associated).

Although the reason text content being received, stored, and/or utilized can be received in the SIP message (e.g., the SIP message from the S-CSCF 304 or the E-CSCF 306, as discussed above in the current disclosure), it is not limited as such. Alternatively or additionally, other reason text content being identified based on the other reason text content being received, stored, and/or generated in any other way can be utilized in a similar way as for the reason text content in the SIP message, for implementing any of the techniques as discussed herein. For example, the other reason text content (e.g., other reason text content received by one or more different network nodes of various types and/or different devices of various types) can be utilized, stored, and/or managed by the LRC/GMLC 310. In additional or alternative examples, the other reason text content can be utilized, stored, and/or managed by one or more other devices based on the other reason text content being utilized, stored, and/or managed by the LRC/GMLC 310.

FIG. 4 is a diagram illustrating example non-emergency signaling 400 between a user equipment (UE), a session call session control function (S-CSCF) node, and a location retrieval function (LRF), as described herein. The signaling 400 can include a call request 402. The call request 402 can include, for example, any type of non-emergency call request (e.g., a short code call request, a toll free call request, any of various other types of call requests, etc.).

The call request 402 can be associated with a non-emergency communication session. The non-emergency communication session can be utilized for a call placed by a user equipment (e.g., any of the UEs 126, as discussed above with reference to FIG. 1. The non-emergency communication session can be managed utilizing the IMS network 102 (e.g., the node(s) of the IMS network 102, as discussed above with reference to FIGS. 1-3) and/or the network(s) 104.

In some examples, the node(s) utilized to manage the non-emergency communication session can include the S-CSCF (e.g., S-CSCF 116), the LRF (e.g., the LRF 118), and/or one or more other nodes of the IMS network 102 and/or the network(s) 104. The short code or toll free call request 402, which can be transmitted by the UE 126 and to the S-CSCF 116, can include a session initiation protocol (SIP) message (e.g., any type of SIP message being transmitted to the S-CSCF 116).

The S-CSCF 116 can perform call state processing (e.g., call state processing 406) to process the call request 402, which can include reason text 404. In some examples, the call state processing 406 can include the reason text 404 being extracted, by the S-CSCF 116, from the call request 402 (e.g., the reason text 404, such as reason text content, can be extracted from the header of the call request 402). In various examples, the reason text conte is extracted from other portions of the call request 502 (e.g., one or more portions of any type (e.g., a non-header portion) of a message and/or signal of any type being received by the S-SCSF 116).

The S-CSCF 116 can utilize the reason text 404 for transmission of a call state message 408. In some examples, the call state message 408 can be transmitted as an SIP message, from the S-CSCF 116 and to the LRF 118. The LRF 118 can receive the reason text 404, and store, utilize, export, modify, delete, replace, and so on, or any combination thereof, the reason text 404.

The network(s), the node(s), and/or the user device(s) can be utilized to perform reason text based processing 410 based on the reason text 404 being stored in the LRF 118. In some examples, the reason text based processing 410 can include the reason text 404 being transmitted to a user device, which can utilize the reason text 404 to perform statistical analysis and/or to create one or more reports. The reason text based processing 410 can be used to generate the statistical analysis result(s) and/or the report(s) being utilized to manage the network(s), such as with the management of the network(s) being performed by modifying the node(s) and/or the network(s). In those or other examples, the reason text based processing 410 can include the reason text 404 being utilized to modify the node(s) and/or the network(s). One or more modifications can include one or more manual modifications (e.g., one or more modifications based on one or more user selections received via user input to the user device(s)), one or more automated modifications, or any combination thereof.

The modification(s) (e.g., the manual modification(s) and/or the automated modification(s)) of the node(s) and/or the network(s) can be utilized to manage current and/or subsequent communication sessions associated with the UE 126 and/or one or more other UEs. Automated management (e.g., the automated modification(s)) can be performed by the reason text 404 triggering the automated management and/or by the reason text 404 setting a flag resulting in execution of software by servers that perform upgrades, modifications, deletions, replacements, etc. or the network(s), the node(s), the communication session(s), and/ or the signaling used to provide network services to the UEs. In some examples, the reason text based processing 410 can be performed based on content (e.g., non-attribute and non-error content), such as the reason text content (e.g., the reason text 404). The reason text content (e.g., the reason text 404), which can be the non-attribute content and/or the non-error code content, can be utilized for the reason text based processing 410, alternatively or additionally, to call state content/event content/error content (e.g., content that includes the call state attribute(s), the event attribute(s), and/or the error code(s)).

The reason text content can be supplemental to, and/or associated with, the call state/event/error content. By way of example, the reason text content can be different from the call state attribute(s) (e.g., one or more attributes identifying a call state), the event attribute(s) (e.g., one or more attributes identifying an event associated with the call state changing, and/or the error code(s) (e.g., one or more error codes, such as one or more SIP error codes, associated with the event). In various implementations, the reason text 404 can identify a cause of a change in a call state, for example, with the reason text 404 identifying why the call state changes and/or why there is an occurrence of an error, etc. The reason being identified can include, for example, an underlying problem, such as a type of way that a caller ends a call, a type of malfunction occurring in a device (e.g., a network node), a reason for the UE 126 losing a connection, etc., or any combination thereof.

In some examples, the reason text 404 can include reason text 404 that is customized and/or selective for a unique problem, based on user input to a user device (e.g., the user input indicating that the reason text 404 is to be used upon any occurrences of types of network problems identified by the user input). Any types of text can be utilized for the reason text 404 based on user input to perform additions, modifications, and/or updates to devices utilized to manage the reason text being capable of being transmitted to any type of CSCF (e.g., the S-CSCF 116) upon occurrences of corresponding network problems.

Providing the reason text 404 to the LRF 118 enables one or more actions (e.g., investigatory, preventative, remedial, etc. action(s)) to be taken in response to an occurrence of a change in communication services. The actions based on the reason text 404 can surpass documentation and/or identification of an occurrence of an undesirable event, such as documentation/identification via the call state attribute(s), the event attribute(s), and/or the error code(s). The reason text 404 can provide, in addition to the call state attribute(s), the event attribute(s), and/or the error code(s), information utilized to understand the cause of the problem, how to fix the problem, and/or how to avoid the problem from reoccurring.

By storing and/or analyzing the reason text 404, information can be collected, collated, compared, and/or analyzed (e.g., such as by user devices (e.g., admin devices)) to understand how to make updates to the network(s) and/or the node(s). The reason text 404 can be utilized to correct current problems, prevent future similar problems from occurring, identify a likelihood of different but related problems from occurring even if they have not yet occurred, increase quality and/or robustness of the network(s) and/or the node(s), and so on, or any combination thereof.

Downstream node originated reason text based processing (e.g., processing based on reason text received in individual ones of one or more response messages (or "response(s)") from one or more downstream nodes) 412 can include one or more responses (e.g., one or more SIP responses) being received from one or more other nodes and/or one or more other networks, the response(s) being utilized to manage signaling (e.g., IMS signaling) and/or messages (e.g., one or more messages in the IMS network). In various implementations, the response(s) (e.g., one or more responses to messages received from the other node(s) and/or the other network(s)) can be received based on one or more messages (e.g., one or more messages associated with one or more errors) being received by the other node(s) and/or the other network(s). In some examples, the response(s), which can include reason text, can be received from the other node(s) (e.g., one or more downstream nodes) (e.g., one or more I-SBCs, such as the I-SBC 316, as discussed above with reference to FIG. 3), the other network(s) (e.g., one or more peering networks, such as one or more other IMS networks, one or more other networks of one or more other types, or any combination thereof), one or more nodes in the peering network(s), or any combination thereof.

In various implementations, the response(s) (e.g., the response(s) from the other node(s) and/or the other network(s)) can be analyzed to identify various types of information (e.g., one or more error attributes (e.g., code(s)/error code attribute(s)), one or more response error codes, reason text, or any combination thereof). Results of the analysis of the response(s), such as results of analysis of any of the received information (e.g., the reason text, etc.), can be utilized to perform one or more actions, such as by managing signaling, managing one or more other messages, or any combination thereof. By way of example, the action(s) can include signaling being managed based on one or more alternative routes determined, based on the response(s) (e.g., the reason text, etc.) for one or more future calls.

In some implementations, the action(s), and/or the type(s) of action(s), performed as part of the downstream node originated reason text based processing 412 can be the same actions or different actions, and/or the same types of actions or different types of actions, as the actions (e.g., investigatory, preventative, remedial, etc. action(s)) and/or the types of actions, taken in response to one or more occurrences of one or more communication service changes based on the reason text 404, as discussed above. By way of example, an action to reroute individual ones of any number of calls (e.g., one or more future calls) can be taken based on identifying that a problem with routing, a network node, a path, etc., occurred with respect to another call and/or signaling for the other call (e.g., a call managed via a peering network). The problem can be identified based on the response text received via the downstream node (e.g., the I-SBC 316), and managed, for example, as part of, or separate from, the reason text based processing 410, the downstream node originated reason text based processing 412, or any combination thereof.

FIG. 5 is a diagram illustrating example emergency signaling 500 between a user equipment (UE), an emergency-call session control function (E-CSCF) node, and a location retrieval function (LRF), as described herein. In some examples, the signaling 500 performed by the UE 126, the E-CSCF 122, and the LRF 124 can be performed in a similar way as for the signaling 400, as discussed above with reference to FIG. 4, being performed by the UE 126, the S-CSCF 116, and the LRF 118, respectively, except by using the E-CSCF 122 to perform at least some functions for emergency calls instead of the S-CSCF 116 used for a non-emergency calls.

In various examples, a call request 502, including reason text 504, can be transmitted by the user equipment 126 and to the E-CSCF 122, in a similar way as for the call request 402 with the reason text 404. In those or other examples, a call request 502, including reason text 504, can be transmitted by the user equipment 126 and to the E-CSCF 122.

The call request 502 can be managed by using the E-CSCF 122 to receive and process the call request 502 according to emergency call procedures (e.g., instead of the S-CSCF 116, as discussed above with reference to FIG. 4, which receives and processes the call request 402 according to non-emergency call procedures).

In some examples, the E-CSCF 122 can use the reason text 504 to perform call state processing 506 (e.g., instead of the S-CSCF 116 processing the call state processing 406 using the reason text 404, as discussed above with reference to FIG. 4). In those or other examples, the E-CSCF 122 can transmit call state message 508 with the reason text 504 to the LRF 124 (e.g., instead of the call state message 408 being transmitted by the S-CSCF 116 based on the reason text 404, as discussed above with reference to FIG. 4). In those or other examples, one or more devices, including the UE 126, the E-CSCF 122, the LRF 124, and/or one or more other devices, can perform reason text based processing 510 (e.g., instead of the reason text based processing 410 being performed by the device(s), including the UE 126, the S-CSCF 116, the LRF 118, and/or the other device(s) as discussed above with reference to FIG. 4).

Although the reason text based processing 410 and the reason text based processing 510 can each be performed, as discussed above in the current disclosure, it is not limited as such. In some examples, the network(s) and/or the node(s) utilized to perform the reason text based processing 510 can prioritize the reason text based processing 510. One or more functions utilized to perform the reason text based processing 510 can be processed based on one or more priority identifiers (e.g., one or more emergency priority identifiers) associated with the function(s) being utilized to perform the reason text based processing 510 being greater than or equal to one or more priority identifiers (e.g., one or more non-emergency priority identifiers) associated with the function(s) being utilized to perform the reason text based processing 410.

The priority identifier(s) and/or any of one or more actions associated therewith, can be managed based on reason text content (e.g., the reason text 404 and/or the reason text 504) stored in, accessed via, and/or exported by, the LRF 118 and/or the LRF 124. Any of the priority identifier(s), for emergencies or non-emergencies, can be managed using any of the network(s) and/or the node(s). By way of example, an emergency priority identifier can be utilized to modify, replace, update, upgrade, etc., or any combination thereof, one or more components of the network(s) and/or the node(s) utilized to manage one or more emergency communication sessions (e.g., reroute a path associated with an emergency communication session to another path with one or more different network nodes) prior to modifying, replacing, updating, upgrading, etc., or any combination thereof, one or more components of the network(s) and/or the node(s) utilized to manage one or more non-emergency communication sessions (e.g., reroute a path associated with a non-emergency communication session to another path with one or more different network nodes).

In some examples, modifying, replacing, updating, upgrading, etc., or any combination thereof, one or more components of the network(s) and/or the node(s) utilized to manage the non-emergency communication sessions can be interrupted, suspended, and/or canceled in order to free up (e.g., re-allocate, etc.) resources (e.g., the network and/or the node device(s)) to modify, replace, update, upgrade, etc., or any combination thereof, the component(s) of the network(s) and/or the node(s) utilized to manage the emergency communication session(s). Such procedures can be managed based on the reason text 404 and/or the reason text 504. By way of example, changes can be initiated, performed, and/or completed, such as for signaling being updated, for a destination location (e.g., a PSAP/ERC, such as the PSAP/ERC 322, a PSAP network, such as the PSAP network 324, etc., or any combination thereof), being modified, and so on, based on the reason text 504, prior to any of one or more changes to signaling, a destination location, etc., being initiated, performed, and/or completed based on the reason text 404.

Downstream node originated reason text based processing (e.g., processing based on reason text received in one or more responses from one or more downstream nodes) 512 can include one or more responses (e.g., one or more SIP responses) being received from one or more other nodes and/or one or more other networks, the response(s) being utilized to manage signaling (e.g., IMS signaling) and/or messages (e.g., one or more messages in the IMS network). In some examples, the downstream node originated reason text based processing 512, which can be associated with one or more emergencies (e.g., one or more emergency calls), can include any of the same functions and/or techniques, and/or one or more different functions and/or techniques, as in the downstream node originated reason text based processing 412. In those or other examples, the downstream node originated reason text based processing 512 can be implemented in a similar way as for the downstream node originated reason text based processing 412, except with the downstream node originated reason text based processing 512 being used for emergencies, instead of non-emergencies for which the downstream node originated reason text based processing 412 is used.

Figure 6:
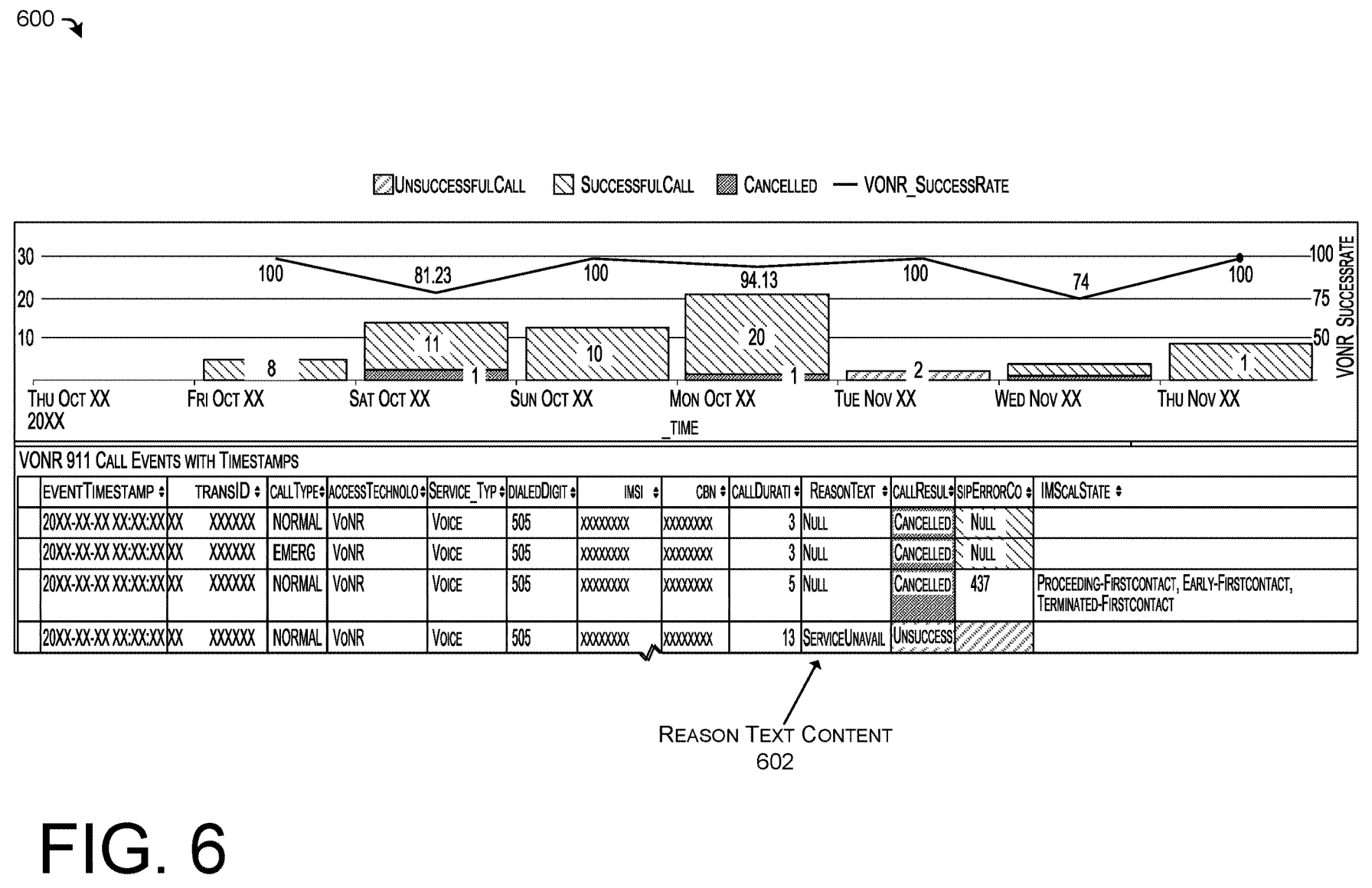

FIG. 6 depicts an example window 600 of a user interface (UI) screen for data analysis using location node based management of session initiation protocol (SIP) messages with reason text content 602. The example window 600 can include the reason text content 602 associated with one or more calls. In some examples, the reason text content 602 can be implemented as the reason text 106 and/or the reason text 108, as discussed above with reference to FIG. 1, the reason text 404, as discussed above with reference to FIG. 4, and/or the reason text 504, as discussed above with reference to FIG. 5. In those or other examples, the reason text content 602 can be presented by the UI screen via a display of a user device, based on the reason text content 602 being received from a location services node, a location retrieval function (LRF), a gateway mobile location center (GMLC), an LRC/GMLC, etc. (e.g., the LRF 118, the LRF 124, the GMLC 204, the LRF 210, the routing destination function (RDF) 212, the LRF/GMLC 310, as discussed above with reference to FIGS. 1-3, and so on, or any combination thereof).

In some examples, the window 600 can show information associated with a point in time, such as a snapshot of data taken at the point in time. The snapshot can include data at the point in time, and/or other data associated with one or more previous points in time.

Individual ones of the reason text content 602 can be associated with at least one call, such as, in some instances, with individual ones of the reason text content 602 being associated with a single call. The reason text content 602, for example, can include reason text identifying a reason that a call state changes and/or that a call ends. By way of example, the reason text content 602 can include no description based on a call being successfully performed and completed (e.g., terminated successfully). In some examples, the reason text content 602 can include a description as "service unavailable," based on a call ending due to a user device (e.g., one of the UEs 126, as discussed above with reference to FIG. 1) losing service. In various examples, the reason text 602 can include various descriptions associate with various reasons for calls being unsuccessful, such as "unexpected UE value," based on the UE sending an unexpected value for a parameter, "P-CSCF cancellation," based on the problem being due to an error in the P-CSCF, etc.

The reason text content 602 can be utilized to identify a reason for the call ending (e.g., a context, such as an assembly of network nodes associated with a communication session for which an error occurred). Although the reason for the call ending cannot be understood by other information (e.g., a call state attribute, an even attribute, an error code, and/or an error identifier, which can be utilized as the error code), the reason text content 602 can be provided simply and understandably, such as in a table, to explain the reason.

The reason text content 602 can be provided in various ways and/or viewable formats. For example, a table can be provided, adjacent to one or more graphs (e.g., a line graph) of any type, one or more tables of any type, and so on, or any combination thereof. Values of the line graph, for example, can be provided in a bar graph form, at corresponding portions of the line graph. Individual bars in the bar graph form being provided for corresponding occurrences of calls can be provided adjacent to the portions of the line graph representing the corresponding values. Information represented by various portions of the line graph can be utilized to identify, for example, occurrences of problems with calls. The occurrences of the problems with calls can be further explained by the reason text content 602, which can identify a cause of the occurrences of the problems.

Although the window 600 can show information associated with a point in time, as discussed above in the current disclosure, it is not limited as such. In some examples, the window 600 can be updated dynamically, such as in real time, to show data representing one or more current communication sessions (e.g., one or more communication sessions currently being utilized by the UEs 124, and/or one or more previous communication sessions). The window 600, for example, can be continually updated while it is being presented.

Figure 7:
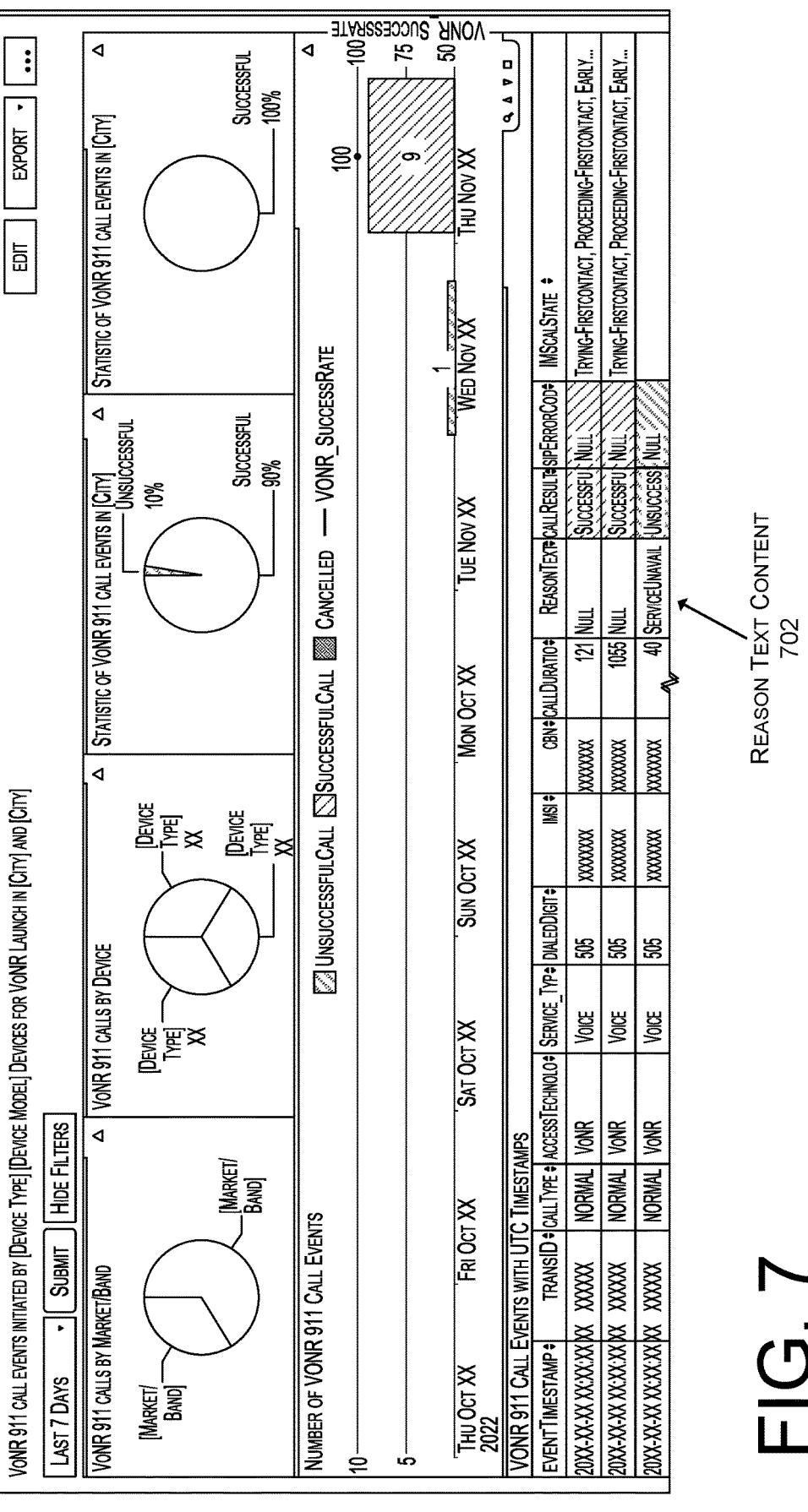
FIG. 7 depicts an example window of a user interface (UI) screen for data analysis using location node based management of session initiation protocol (SIP) messages with reason text content.

FIG. 7 depicts an example window 700 of a user interface (UI) screen for data analysis using location node based management of session initiation protocol (SIP) messages with reason text content 702. The example window 700 can include the reason text content 702 associated with one or more calls. In some examples, the reason text content 702 can be implemented similarly as for the reason text content 602, except with data being represented in different ways (e.g., different formats).

In some examples, the example window 700 can include similar or different types of information as in the example window 600, in a different format. For example, the example window 700 can include pie charts representing information related to occurrences of calls. The reason text content 702 can include information associate with reasons for changes in the calls, such as whether a call was terminated successfully, or whether a call was ended due to a user device (e.g., one of the UEs 126, as discussed above with reference to FIG. 1) losing service.

Figure 8:
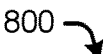
FIG. 8 is a flow diagram of an illustrative process for location node based management of call state reason text content, in accordance with examples of the disclosure.

FIG. 8 is a flow diagram 800 of an illustrative process for location node based management of call state reason text content, in accordance with examples of the disclosure.

At operation 802, the process can include receiving a message associated with a communication session being initiated for a user equipment (UE). The message can include an SIP message (e.g., an SIP invite message). The message, which can be received from the UE (e.g., a UE 126), can be received by a serving call session control function node (e.g., the S-CSCF 116) or by an emergency call session control function node (e.g., the E-CSCF 122). The S-CSCF 116 can receive the message if the message is a non-emergency message. The E-CSCF 122 can receive the message if the message is an emergency message.

At operation 804, the process can include identifying reason information associated with a status of the communication session, the reason information including reason text. The S-CSCF 116 and/or the E-CSCF 122 can identify the reason text by extracting the reason text from the received message.

At operation 806, the process can include transmitting, to another network element, a session initial protocol (SIP) message including the reason text. The S-CSCF 116 and/or the E-CSCF 122 can insert the extracted reason text in the SIP message being transmitted. The SIP message with the inserted reason text can be transmitted to a gateway mobile location center (GMLC), such as the LRC/GMLC 310. The reason text can be stored by the LRC/GMLC 310 and/or utilized for generating reports and/or statistical analysis results, presenting information via user displays, and/or managing (e.g., manually and/or automatically managing) network(s), node(s), and/or communication session(s)

Figure 9:
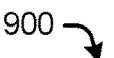
FIG. 9 is a block diagram of an example server computer utilized to implement telecommunication network selection data management systems, in accordance with some examples of the present disclosure.
Figure 9:
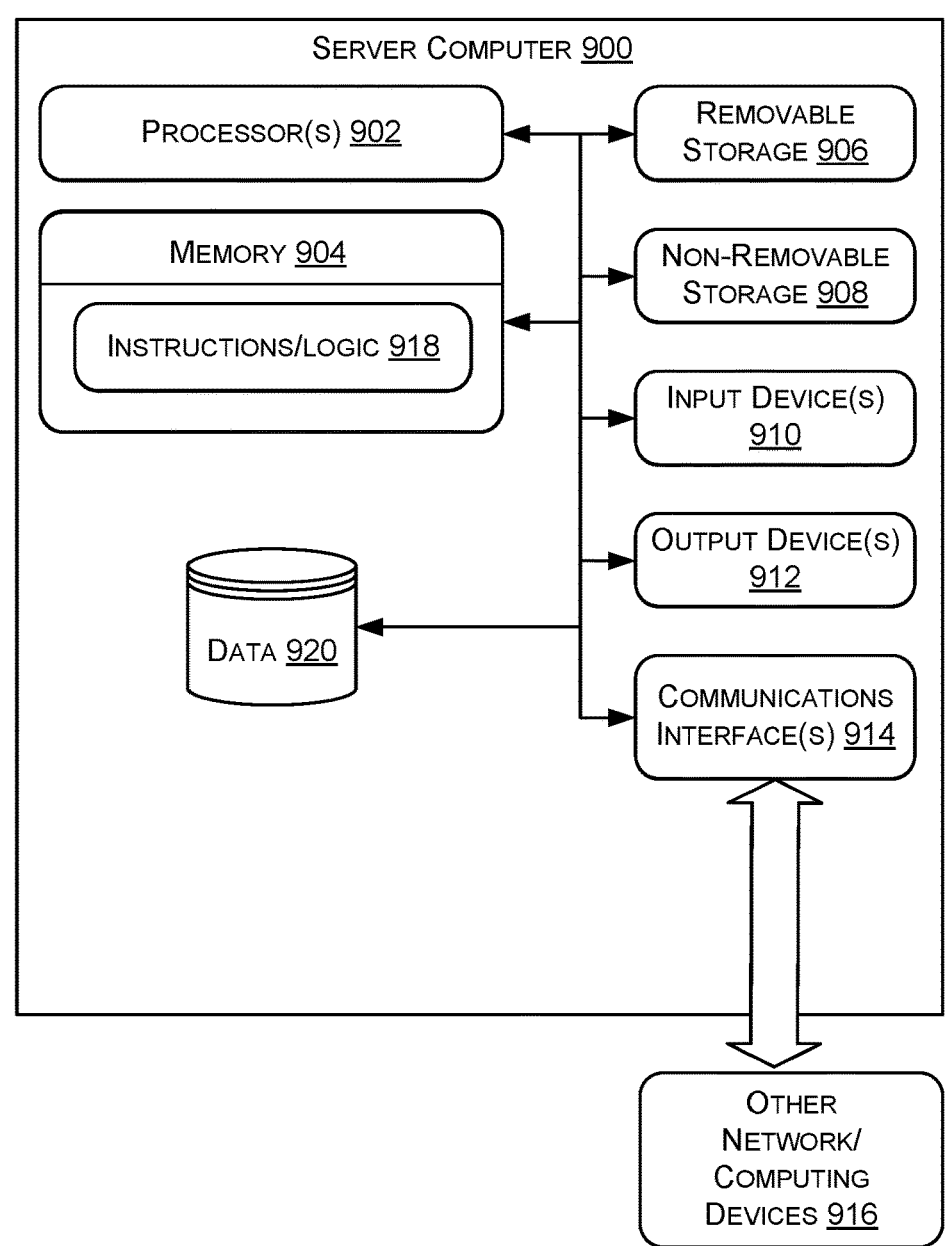

FIG. 9 is a block diagram of an example server computer utilized to implement telecommunication network selection data management systems, in accordance with some examples of the present disclosure.

The server computer 900 may be representative of a cellular data management system (e.g., a cellular data management system utilized to implement the IMS network 102, the network(s) 104, etc., as discussed above with reference to FIG. 1), one or more devices (e.g., any of the server computer(s) 128), one or more other devices and/or systems, or any combination thereof.

As shown, the server computer 900 may include one or more processors 902 and one or more forms of computer-readable memory 904. The server computer 900 may also include additional storage devices. Such additional storage may include removable storage 906 and/or non-removable storage 908.

The server computer 900 may further include input devices 910 (e.g., a touch screen, keypad, keyboard, mouse, pointer, microphone, etc.) and output devices 912 (e.g., a display, printer, speaker, etc.) communicatively coupled to the processor(s) 902 and the computer-readable memory 904. The server computer 900 may further include communications interface(s) 914 that allow the server computer 900 to communicate with other computing devices 916 (e.g., the UE(s) 126, etc.) such as via a network. The communications interface(s) 914 may facilitate transmitting and receiving wired and/or wireless signals over any suitable communications/data technology, standard, or protocol, as described herein.

In various embodiments, the computer-readable memory 904 comprises non-transitory computer-readable memory 904 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 904 may also be described as computer storage media and may include volatile and nonvolatile, removable and non-removable media implemented in any method or technology for storage of information, such as computer readable instructions, data structures, program modules, or other data. Computer-readable memory 904, removable storage 906 and non-removable storage 908 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the server computer 900. Any such computer-readable storage media may be part of the server computer 900.

The memory 904 can include logic 918 (i.e., computer-executable instructions that, when executed, by the processor(s) 902, perform the various acts and/or processes disclosed herein) to implement synchronization of subscriber data, according to various examples as discussed herein. For example, the logic 918 is configured to carry out signaling and/or communications, and/or to manage reason text data, associated with and the UE(s) 126. The memory 904 can further be used to store data 920, which may be used to implement synchronization of subscriber data and/or to manage the reason text content, as discussed herein. In one example, the data 920 may include any type of network information, such as the reason text content (e.g., the reason text content, as discussed above with reference to FIGS. 1-8, such as the reason text 106 and/or the reason text 108), one or more attributes (e.g., one or more call state attributes, one or more event attributes, one or more error codes, etc.), and so or, or any combination thereof.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

What is claimed is:

1. A method comprising:

receiving, by a first node, an invitation message associated with a communication session being initiated for a user equipment (UE);

identifying, by the first node, a message type associated with a session initial protocol (SIP) message to be transmitted for the communication session;

identifying, by the first node, a status identifier associated with the communication session;

identifying, by the first node, reason information associated with a status of the communication session, the reason information including reason text, wherein the reason information further includes an error identifier, the error identifier including an error code that is different from the reason text, the reason text identifying context of the communication session being canceled; and transmitting, by the first node and to a second node, the SIP message of the message type, the SIP message including the status identifier and the reason text.

2. The method of claim 1, wherein the status identifier includes a state attribute representing the status, and the reason text includes a detailed description associated with the status.

3. The method of claim 1, wherein the first node is an emergency-call session control function (E-CSCF) node, and the second node is an emergency gateway mobile location center (GMLC) node.

4. The method of claim 1, wherein the first node is a serving-call session control function (S-CSCF) node, and the second node is of a different type than a gateway mobile location center (GMLC) node.

5. The method of claim 1, wherein the communication session includes an emergency communication session, further comprising:

identifying, by the first node, another message type associated with another SIP message for a non-emergency communication session;

identifying, by the first node, other reason information associated with another status of the non-emergency communication session; and transmitting, by the first node and to a third node, the other SIP message including the other reason information, the third node being a non-emergency gateway mobile location center (GMLC) node.

6. The method of claim 1, extracting, as the reason text to be included in the SIP message, invitation header text from the invitation message; and inserting the reason text in a header of the SIP message.

7. The method of claim 1, further comprising:

identifying a path including a third node utilized for the communication session; and rerouting the path to another path including, instead of the third node, a fourth node utilized for the communication session, based on the reason text.

8. The method of claim 1, further comprising:

identifying a path including a third node utilized for the communication session;

identifying another path including, instead of the third node, a fourth node utilized for another communication session, based on the reason text; and utilizing the other path for the other communication session to manage a network service for another UE.

9. A network element, comprising:

one or more processors; and memory storing computer-executable instructions that, when executed by the one or more processors, cause the one or more processors to perform operations comprising:

receiving a message associated with a communication session being initiated for a user equipment (UE);

identifying reason information associated with a status of the communication session, the reason information including reason text, wherein the reason information further includes an error identifier, the error identifier including an error code that is different from the reason text, the reason text identifying context of the communication session being canceled; and transmitting, to another network element, a session initial protocol (SIP) message including the reason text.

10. The network element of claim 9, wherein the reason information further includes a status identifier, the status identifier including a state attribute representing the status, and wherein the reason text includes a detailed description associated with the status.

11. The network element of claim 9, wherein the other network element is an emergency gateway mobile location center (GMLC) node.

12. The network element of claim 9, wherein the other network element is a network node of a different type than a gateway mobile location center (GMLC) node.

13. The network element of claim 9, wherein the communication session includes an emergency communication session, and wherein the emergency communication session is initiated based at least in part on a 911 call placed by the UE.

14. The network element of claim 9, wherein the communication session includes a non-emergency communication session, and wherein the non-emergency communication session is initiated based at least in part on a call being placed by the UE, the call being a non-emergency short code call or a toll free call.

15. A system comprising:

one or more processors; and memory storing computer-executable instructions that, when executed by the one or more processors, cause the one or more processors to perform operations comprising:

receiving a message associated with a communication session being initiated for a user equipment (UE);

identifying reason information associated with a status of the communication session, the reason information including reason text, wherein the reason information further includes an error identifier, the error identifier including an error code that is different from the reason text, the reason text identifying context of the communication session being canceled; and transmitting, to another network element, a session initial protocol (SIP) message including the reason text.

16. The system of claim 15, wherein the reason information further includes a status identifier, the status identifier including a state attribute representing the status, and wherein the reason text includes a detailed description associated with the status.

17. The system of claim 15, wherein the other network element is an emergency gateway mobile location center (GMLC) node.

\* \* \* \* \*